US 9,724,965 B2

(12) United States Patent
Gottschalk

(10) Patent No.: US 9,724,965 B2
(45) Date of Patent: Aug. 8, 2017

(54) FABRICATED VEHICLE AXLE

(75) Inventor: Michael J. Gottschalk, McKinney, TX (US)

(73) Assignee: Hendrickson USA, L.L.C., Itasca, IL (US)

( * ) Notice: Subject to any disclaimer, the term of this patent is extended or adjusted under 35 U.S.C. 154(b) by 1036 days.

(21) Appl. No.: 13/526,661

(22) Filed: Jun. 19, 2012

(65) Prior Publication Data

US 2013/0278047 A1    Oct. 24, 2013

Related U.S. Application Data

(60) Provisional application No. 61/635,953, filed on Apr. 20, 2012.

(51) Int. Cl.
*B60B 35/00* (2006.01)
*B60B 35/06* (2006.01)
*B60B 35/08* (2006.01)

(52) U.S. Cl.
CPC .......... *B60B 35/003* (2013.01); *B60B 35/007* (2013.01); *B60B 35/06* (2013.01); *B60B 35/08* (2013.01); *B60B 2310/211* (2013.01); *B60B 2310/302* (2013.01); *B60B 2900/111* (2013.01);
(Continued)

(58) Field of Classification Search
CPC ....... B60B 35/00; B60B 35/003; B60B 35/08; B60B 35/007; B60B 35/06; B60B 2900/113; B60B 37/00; B23P 15/00
USPC .... 301/124.1, 125, 126, 128, 129, 130, 137; 29/897.2; 280/93.512, 93.502, 93.51, 280/93.511
See application file for complete search history.

(56) References Cited

U.S. PATENT DOCUMENTS

| 551,291 A | * 12/1895 | Mannesmann ......... B60B 35/08 301/124.1 |
| 1,690,511 A | 11/1928 | Urschel |
| 1,784,856 A | 12/1930 | Urschel |

(Continued)

FOREIGN PATENT DOCUMENTS

| DE | 932 647 C | 9/1955 |
| DE | 19930672 A1 | 1/2000 |

(Continued)

OTHER PUBLICATIONS

ArvinMeritor RideStar RAL Front Air Suspension, 2003 Mid-America Trucking Show, circa 2003.
(Continued)

*Primary Examiner* — S. Joseph Morano
*Assistant Examiner* — Jean Charleston
(74) *Attorney, Agent, or Firm* — Cook Alex Ltd.

(57) ABSTRACT

A vehicle axle body is provided for incorporation into a vehicle axle. The vehicle axle body may be comprised of first and second axle body pieces. The first axle body piece may define at least a portion of a lower surface of the vehicle axle body and at least a portion of one of a front surface and a rear surface of the vehicle axle body. The second axle body piece is secured to the first axle body piece and may define at least a portion of an upper surface of the vehicle axle body and at least a portion of the other one of the front surface and the rear surface of the vehicle axle body. The thickness of the first and second axle body pieces may be different. Suspension component supports may be integrally formed with the upper and/or bottom surfaces of the axle body.

38 Claims, 10 Drawing Sheets

(52) U.S. Cl.
CPC .... *B60B 2900/113* (2013.01); *Y10T 29/49622* (2015.01)

(56) References Cited

U.S. PATENT DOCUMENTS

| | | | |
|---|---|---|---|
| 1,823,158 | A | 9/1931 | Spatta et al. |
| 1,899,347 | A | 2/1933 | Spatta et al. |
| 2,148,714 | A | 2/1939 | Urschel |
| 3,804,467 | A | 4/1974 | Austermann |
| 5,429,423 | A * | 7/1995 | Pollock et al. ............ 301/124.1 |
| 5,588,660 | A | 12/1996 | Paddison |
| 5,741,027 | A | 4/1998 | Stroh |
| 5,810,377 | A | 9/1998 | Keeler et al. |
| 5,865,452 | A | 2/1999 | Chalin |
| 6,394,473 | B1 | 5/2002 | Platner |
| 6,439,672 | B1 * | 8/2002 | Simon ........................ 301/124.1 |
| 6,609,764 | B2 | 8/2003 | Dudding et al. |
| 6,799,811 | B1 | 10/2004 | Dauber et al. |
| 7,328,908 | B2 | 2/2008 | Barber et al. |
| 7,445,220 | B2 | 11/2008 | von Mayenburg et al. |
| 2004/0227395 | A1 * | 11/2004 | Katae .................... B60B 35/08 301/124.1 |
| 2004/0256910 | A1 * | 12/2004 | Chalin et al. .............. 301/124.1 |
| 2006/0244236 | A1 * | 11/2006 | Cortez et al. .......... 280/124.175 |
| 2008/0190723 | A1 * | 8/2008 | Heck et al. ................... 192/3.29 |
| 2008/0238015 | A1 | 10/2008 | Dudding et al. |
| 2009/0230760 | A1 | 9/2009 | Bubulka et al. |
| 2010/0038877 | A1 * | 2/2010 | Cortez et al. .......... 280/124.175 |
| 2012/0056469 | A1 | 3/2012 | Bubulka et al. |
| 2012/0146396 | A1 | 6/2012 | Bubulka et al. |

FOREIGN PATENT DOCUMENTS

| | | |
|---|---|---|
| DE | 10 2007 025684 A1 | 4/2008 |
| GB | 289684 A | 5/1928 |

OTHER PUBLICATIONS

Hendrickson USA, L.L.C., Composolite FX—Fixed-axle suspension system, circa 2006.

International Search Report and Written Opinion of the International Searching Authority for PCT Patent Application No. PCT/US2012/044573, dated Feb. 22, 2013.

* cited by examiner

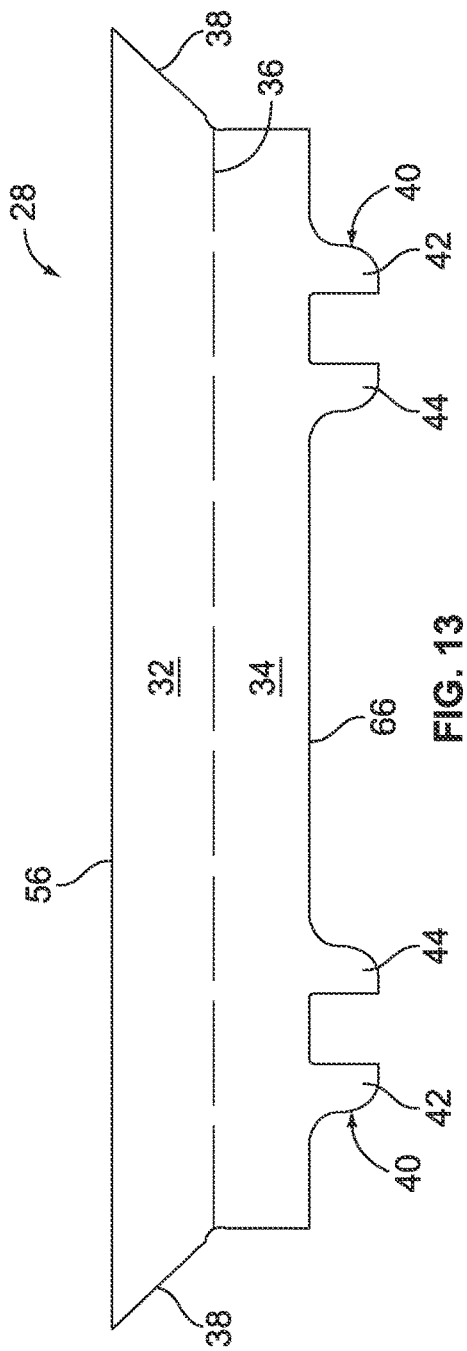
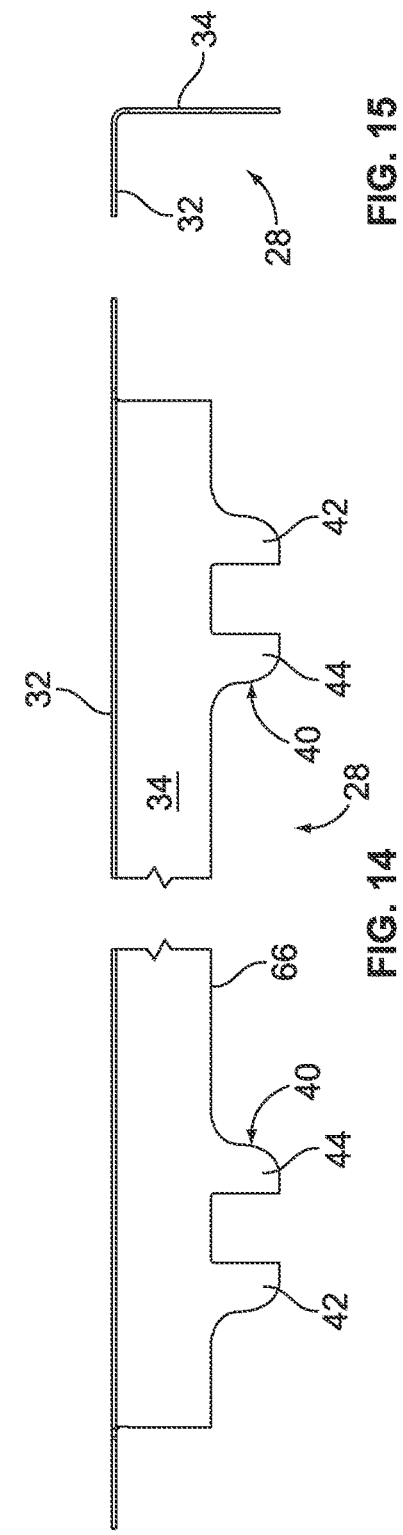

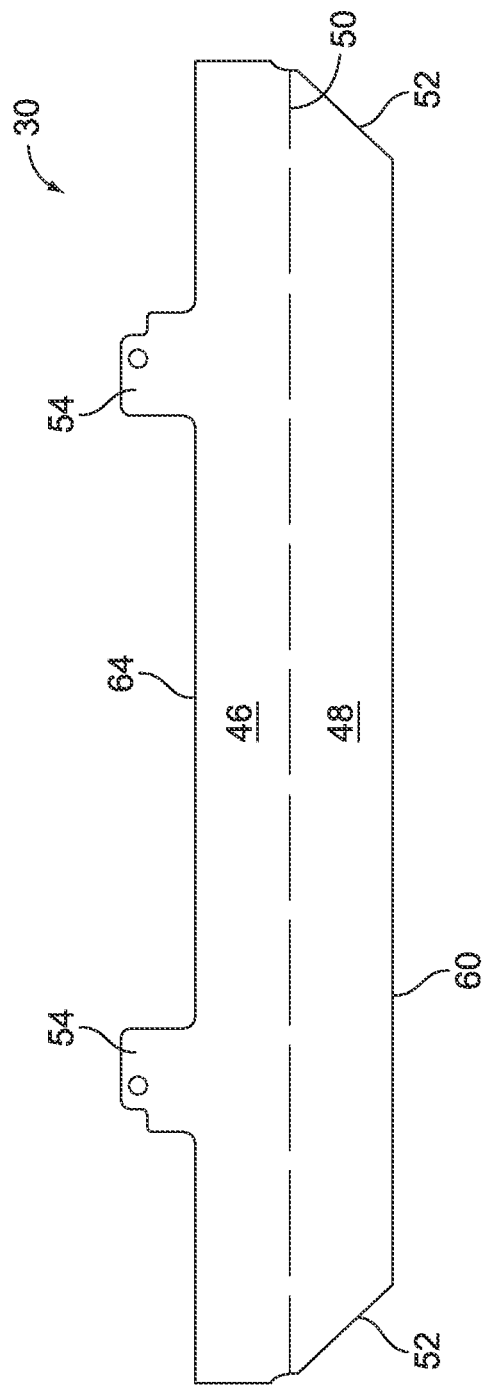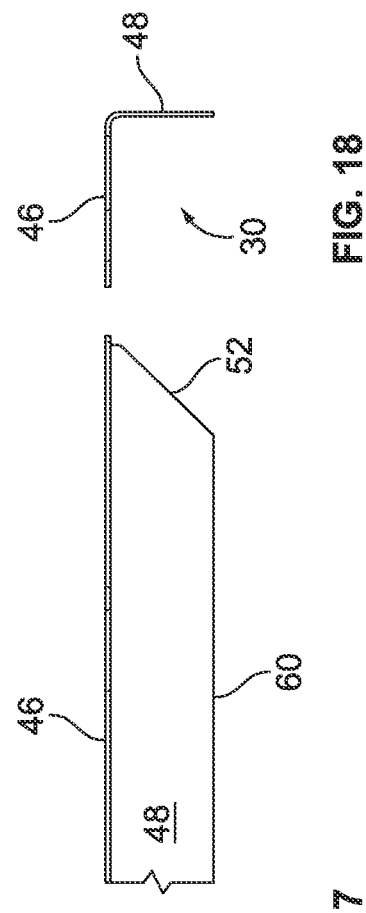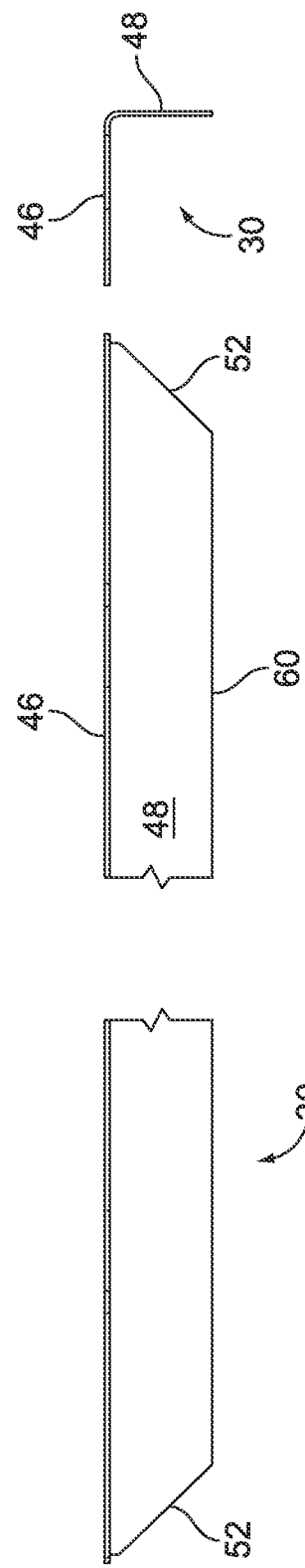

FABRICATED VEHICLE AXLE

CROSS-REFERENCE TO RELATED APPLICATIONS

This application claims the benefit of U.S. Provisional Patent Application No. 61/635,953, filed Apr. 20, 2012, which is hereby incorporated herein by reference.

BACKGROUND

Field of the Disclosure

The present subject matter relates generally to axles for vehicles and more particularly to vehicles axle bodies fabricated from two or more metal plates, sheets, or pieces.

Description of Related Art

Older axle assemblies for vehicles typically include a forged axle body (such as an I-beam axle body), and a pair of steering knuckles pivotally attached to opposite ends of the axle body by way of king pins. Although they are generally strong and reliable, such forged axle bodies are limited in their shape, are relatively heavy, and require a relatively large amount of machining. All of this translates into increased manufacturing and payload costs.

In view of the foregoing, fabricated axle bodies have been developed. Such axle bodies are typically manufactured from sheets of steel that are cut and then welded together. Fabricated axle bodies generally weigh less than forged I-beam axle bodies. For at least one known application, a forged I-beam steering axle for use with heavy-duty trucks weighs approximately one hundred ninety-five pounds, whereas an equivalent typical fabricated axle weighs approximately one hundred twenty-five pounds. In the case of commercial vehicles, including heavy-duty truck commercial vehicles, this translates into substantially increased payload capacity.

Another benefit of fabricated axle bodies is that the material used (e.g., steel) can be spread around for more efficient distribution thereof. This can contribute to making the fabricated axle body much lighter, and can even make it stiffer against both bending and torsion stresses. On top of all this, fabricated axle bodies typically require less machining than forged axle bodies. Accordingly, they are easier and less expensive to manufacture.

Examples of known fabricated axles are shown and described in U.S. Pat. No. 5,810,377 to Keeler et al.; U.S. Pat. No. 6,609,764 to Dudding et al.; and U.S. Pat. No. 7,862,058 to Bubulka et al., all of which are hereby incorporated herein by reference.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately as set forth in the claims appended hereto.

In one aspect, a vehicle axle body comprises a first axle body piece and a second axle body piece. The first axle body piece defines at least a portion of a lower surface of the vehicle axle body and at least a portion of one of a front surface and a rear surface of the vehicle axle body. The second axle body piece is secured to the first axle body piece and defines at least a portion of an upper surface of the vehicle axle body and at least a portion of the other one of the front surface and the rear surface of the vehicle axle body.

In another aspect, a method of manufacturing a vehicle axle body includes providing first and second axle body pieces and forming them into bent configurations. The first axle body piece is secured to the second axle body piece, with the first axle body piece defining at least a portion of a lower surface of the vehicle axle body and at least a portion of one of a front surface and a rear surface of the vehicle axle body, and with the second axle body piece defining at least a portion of an upper surface of the vehicle axle body and at least a portion of the other one of the front surface and the rear surface of the vehicle axle body.

In yet another aspect, a vehicle axle body comprises an upper surface, a lower surface, a front surface extending between the upper and lower surfaces, and a rear surface extending between the upper and lower surfaces. The rear surface has a different thickness than the front surface.

In another aspect, a vehicle axle body comprises an upper surface, a lower surface, a front surface extending between the upper and lower surfaces, and a rear surface extending between the upper and lower surfaces. An upper suspension component support is integrally formed with the upper surface and extends beyond the rear surface.

In yet another aspect, a vehicle axle body comprises an upper surface, a lower surface, a front surface extending between the upper and lower surfaces, and a rear surface extending between the upper and lower surfaces. A lower suspension component support is integrally formed with the lower surface and extends beyond the front surface.

In another aspect, a vehicle axle comprises a vehicle axle body having an upper surface, a lower surface, a front surface extending between the upper and lower surfaces, and a rear surface extending between the upper and lower surfaces. The vehicle axle also includes an axle seat secured to at least one of the upper, lower, front, and rear surfaces by a weld having a weld stop location located at an area of the vehicle axle body spaced away from the upper, lower, front, and rear surfaces of the vehicle axle body.

In yet another aspect, a method of manufacturing a vehicle axle includes providing a vehicle axle body having front, rear, upper, and lower surfaces. An axle seat is provided and welded to at least one of the surfaces by a weld having a weld stop location located at an area of the vehicle axle body spaced away from the upper, lower, front, and rear surfaces of the vehicle axle body.

BRIEF DESCRIPTION OF THE DRAWINGS

FIG. 13 is a plan view of a first axle body piece of the axle body of FIG. 10, in an unbent configuration;

FIG. 14 is a front elevational view of the first axle body piece of FIG. 13, in a bent configuration;

FIG. 15 is a side elevational view of the first axle body piece of FIG. 13, in a bent configuration;

FIG. 16 is a plan view of a second axle body piece of the axle body of FIG. 10, in an unbent configuration;

FIG. 17 is a front elevational view of the second axle body piece of FIG. 16, in a bent configuration;

FIG. 18 is a side elevational view of the second axle body piece of FIG. 16, in a bent configuration;

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 6:
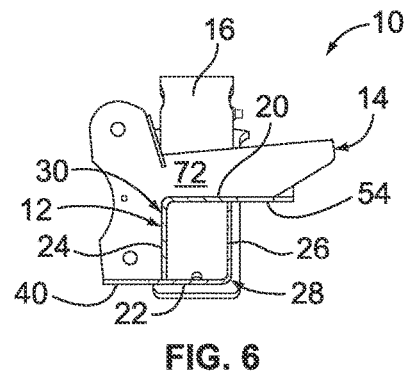
FIG. 6 is a cross-section view of the vehicle axle of FIG. 1, taken through line 6-6 of FIG. 4.
Figure 7:
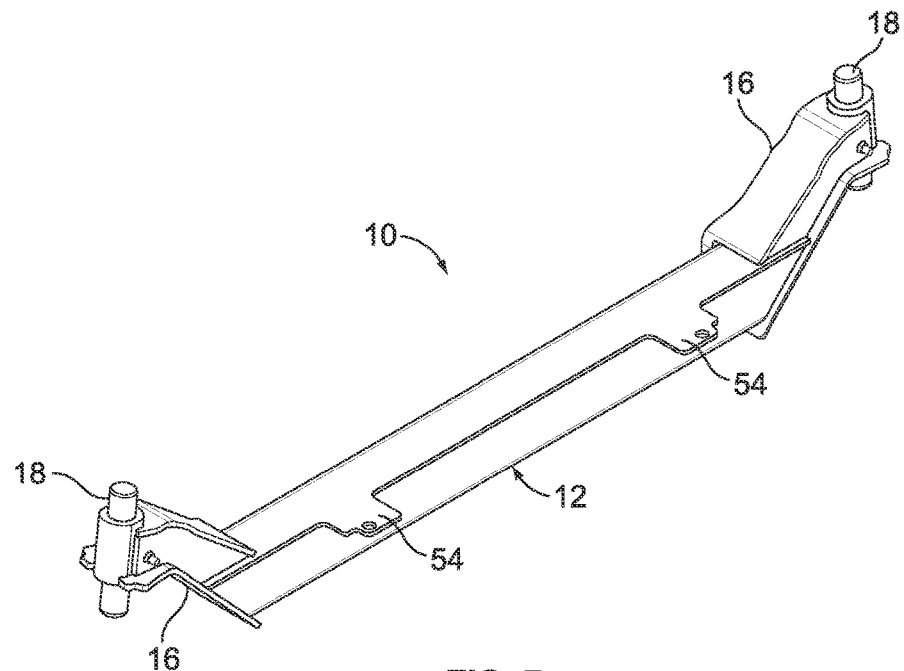
FIG. 7 is a rear perspective view of the vehicle axle of FIG. 1, with axle seats thereof omitted for clarity.

FIGS. 1-6 illustrate an embodiment of a fabricated vehicle axle generally designated 10 constructed in accordance with an aspect of the present disclosure. FIG. 7 is a cross-sectional view of the axle 10, taken through the line 6-6 of FIG. 4. The axle 10 includes a main body portion 12, a pair of axle seats 14, two gooseneck portions 16 positioned at or adjacent to opposite ends of the axle body 12, and two king pins 18 associated with the gooseneck portions 16. The various components of the axle 10 may be secured to each other by a variety of means (e.g., mechanical fasteners, adhesion, and/or press-fitting), but in one embodiment, the various parts (with the exception of the king pins 18, which are typically secured to the gooseneck portions 16 by draw keys or the like) are welded together along their respective points and lines of intersection.

Figure 8:
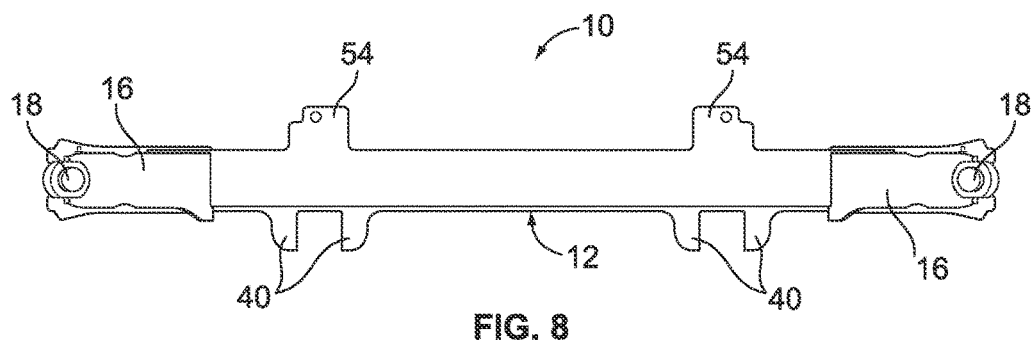
FIG. 8 is a top plan view of the vehicle axle of FIG. 7.
Figure 9:
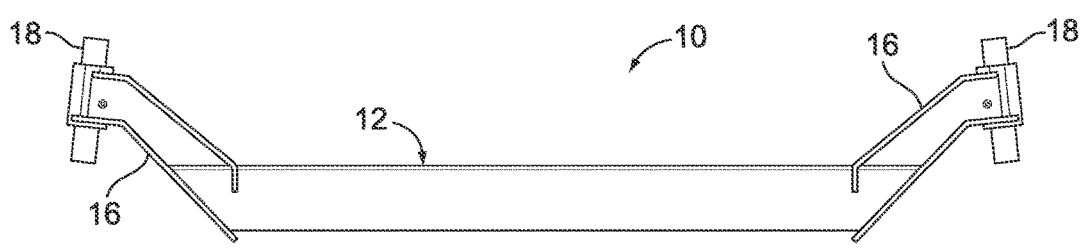
FIG. 9 is a front elevational view of the vehicle axle of FIG. 7.
Figure 10:
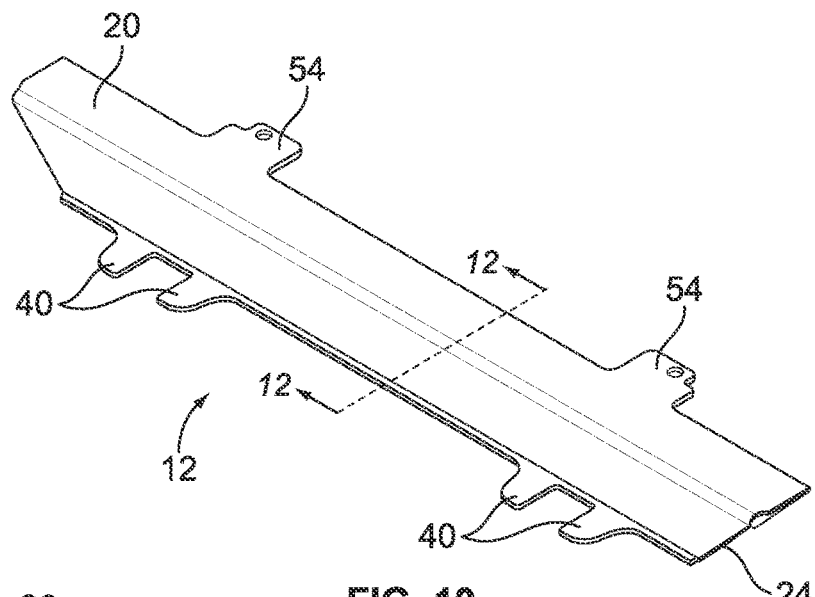
FIG. 10 is a front perspective view of a body portion of the vehicle axle of FIG. 1.
Figure 11:
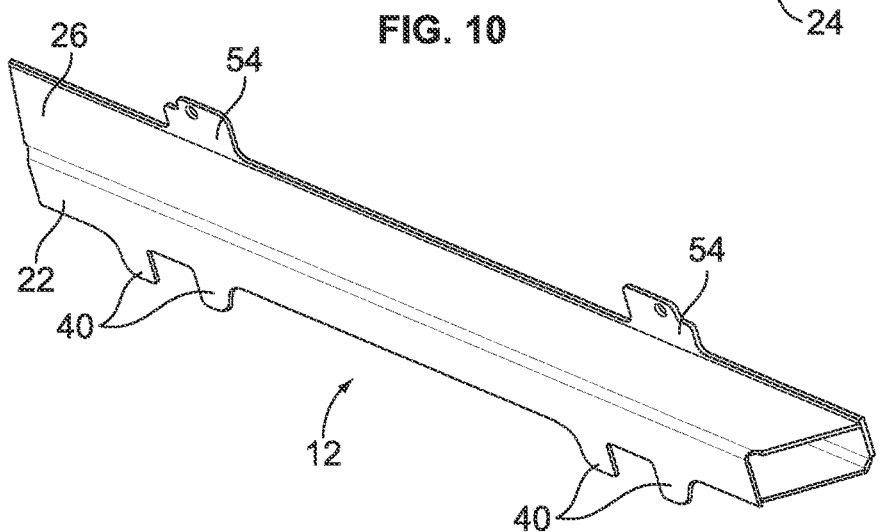
FIG. 11 is a rear perspective view of the axle body of FIG. 10.

FIGS. 7-9 show the axle 10 with the axle seats 14 omitted to better illustrate the axle body 12. FIGS. 10 and 11 show the axle body 12 isolated from the other components of the axle 10.

The axle body 12 has opposed upper and lower surfaces 20 and 22, with opposed front and rear surfaces 24 and 26 extending between the upper and lower surfaces 20 and 22. According to one aspect of the present disclosure, the axle body 12 is comprised of first and second axle body pieces or plates or members or elements that are secured to each other to define the surfaces of the axle body 12. The first axle body piece 28 is illustrated in greater detail in FIGS. 13-15, while the second axle body piece 30 is illustrated in greater detail in FIGS. 16-18. The illustrated first and second axle body pieces 28 and 30 are merely exemplary, and first and second axle body pieces which have a different configuration from those shown in FIGS. 13-18 are within the scope of the present disclosure.

Figure 12:
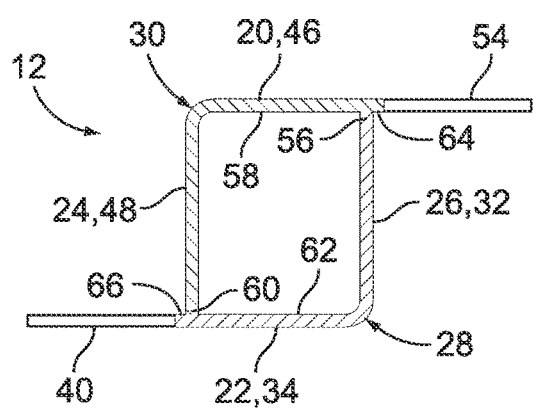
FIG. 12 is a cross-sectional view of the axle body of FIG. 10, taken through line 12-12 of FIG. 10.

In one embodiment, the first axle body piece 28 defines at least a portion of the lower surface 22 of the axle body 12 and at least a portion of either the front surface 24 or the rear surface 26 of the axle body 12. The first axle body piece 28 may define substantially all of the lower surface 22 and substantially all of the front surface 24 or rear surface 26. In the illustrated embodiment, the first axle body piece 28 defines substantially all of the lower surface 22 and substantially all of the rear surface 26 of the axle body 12 (FIGS. 6 and 12). In other embodiments, the first axle body piece may define substantially all or a portion of the lower surface and substantially all or a portion of the front surface of an axle body.

The second axle body piece 30 may define at least a portion of the upper surface 20 of the axle body 12 and at least a portion of the front surface 24 or rear surface 26 of the axle body 12 (i.e., a portion of whichever of the front and rear surfaces 24 and 26 is not defined by the first axle body piece 28). The second axle body piece 30 may define substantially all of the upper surface 20 and substantially all of the front surface 24 or rear surface 26. In the illustrated embodiment, the second axle body piece 30 defines substantially all of the upper surface 20 and substantially all of the front surface 24 of the axle body 12 (FIGS. 6 and 12). In other embodiments, the second axle body piece may define substantially all or a portion of the lower surface and substantially all or a portion of the rear surface of an axle body.

FIGS. 13 and 16 illustrate the first and second axle body pieces 28 and 30, respectively, in unformed or unbent or flat configurations. In one embodiment of a method for forming the first axle body piece 28 or the second axle body piece 30, a flat piece of material (e.g., a rectangular strip of metal) may be cut or otherwise formed to define the illustrated shape. The unformed first axle body piece 28 may be considered to have two portions 32 and 34 that are separated by a bend line 36. When the unformed first axle body piece 28 (FIG. 13) is bent or otherwise deformed along the bend line 36 to place the first axle body piece 28 into a bent or formed configuration (FIGS. 14 and 15), each of the two portions 32 and 34 is configured to define one of the sides or surfaces of a vehicle axle 12. The unformed first axle body piece 28 may be bent or deformed to an approximately 90° angle (e.g., in the range of 85-95° in one embodiment) to place it in the formed or bent configuration of FIGS. 14 and 15.

In the illustrated embodiment, the first portion 32 of the first axle body piece 28 is configured to define the rear wall or side or surface 26 of a vehicle axle 26. Accordingly, it may include ends 38 that are angled or otherwise configured to accommodate gooseneck portions 16 secured to the ends of the axle body 12. The second portion 34 of the illustrated first axle body piece 28 is configured to provide the lower wall or side or surface 22 of a vehicle axle 12.

The lower surface 22 may be integrally formed with one or more lower suspension component supports 40 (FIG. 2), which are extensions or tabs or flanges that extend beyond the front surface 24 of the axle body 12 to receive a portion of a suspension component, such as an axle seat 14. If, as in the illustrated embodiment, the second portion 34 of the first axle body piece 28 defines the lower surface 22 of the axle body 12, one or more lower suspension component supports 40 may be integrally formed therewith. In the illustrated embodiment, the second portion 34 of the first axle body piece 28 (and, hence, the lower surface 22 of the axle body 12) is provided with a pair of lower suspension component supports 40, each of which is comprised of an outboard tab 42 and an inboard tab 44. Each illustrated tab 42, 44 is configured to support a vertically aligned ear of the associated axle seat 14 for securing the axle seat 14 to the lower suspension component support 40, as will be described in greater detail herein. The configuration of the lower suspension component support may vary depending on the configuration of the associated suspension component, so the illustrated lower suspension component supports 40 should be considered exemplary, rather than limiting.

Similar to the first axle body piece 28, the unformed second axle body piece 30 may be considered to have two portions 46 and 48 that are separated by a bend line 50. When the unformed second axle body piece 30 (FIG. 16) is bent or otherwise deformed along the bend line 50 to place the second axle body piece 30 into a bent or formed configuration (FIGS. 17 and 18), each of the two portions 46 and 48 is configured to define one of the sides or surfaces of a vehicle axle 12. The unformed second axle body piece 30 may be bent or deformed to an approximately 90° angle (e.g., in the range of 85-95° in one embodiment) to place it in the formed or bent configuration of FIGS. 17 and 18.

In the illustrated embodiment, the second portion 48 of the second axle body piece 30 is configured to define the front wall or side or surface 24 of a vehicle axle 12. Accordingly, it may include ends 52 that are angled or otherwise configured to accommodate gooseneck portions 16 secured to the ends of the axle body 12. The first portion 46 of the illustrated second axle body piece 30 is configured to provide the upper wall or side or surface 20 of a vehicle axle 12.

The upper surface 20 may be integrally formed with one or more upper suspension component supports 54 (FIG. 6), which are extensions or tabs or flanges that extend beyond the rear surface 26 of the axle body 12 to receive a portion of a suspension component, such as an axle seat 14. If, as in the illustrated embodiment, the first portion 46 of the second axle body piece 30 defines the upper surface 20 of the axle body 12, one or more upper suspension component supports 54 may be integrally formed therewith. In the illustrated embodiment, the first portion 46 of the second axle body piece 30 (and, hence, the upper surface 20 of the axle body 12) is provided with a pair of upper suspension component supports 54. Each upper suspension component support 54 is configured to support one or more vertically aligned frame members of the associated axle seat 14 for securing the axle seat 14 to the upper suspension component support 54, as will be described in greater detail herein. The configuration of the upper suspension component support may vary depending on the configuration of the associated suspension component, so the illustrated upper suspension component supports 54 should be considered exemplary, rather than limiting.

Figure 6A:
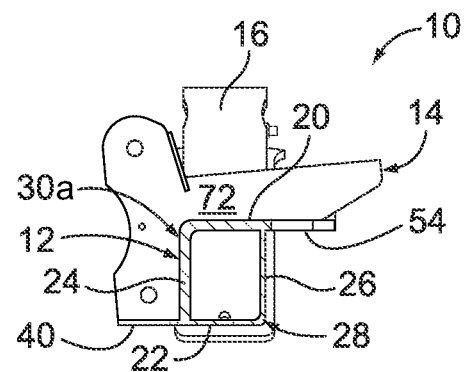
FIG. 6A is a cross-section view of the vehicle axle of FIG. 1, taken through line 6-6 of Fig. 4, wherein the axle body piece defining the upper and front surfaces of the axle body is thicker than the axle body piece defining the lower and rear surfaces of the axle body.
Figure 6B:
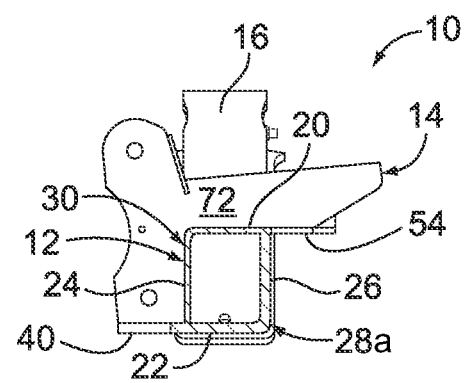
FIG. 6B is a cross-section view of the vehicle axle of FIG. 1, taken through line 6-6 of FIG. 4, wherein the axle body piece defining the lower and rear surfaces of the axle body is thicker than the axle body piece defining the upper and front surfaces of the axle body.

The various walls or sides or surfaces of an axle body according to the present disclosure may having different thicknesses. For example, in one embodiment, the front surface has a different thickness than the rear surface. Depending on the nature of the axle body and the vehicle in which it will be incorporated, it may be preferable for the axle body to have a thicker front surface and a thinner rear surface (see, for example, FIG. 6A). In other circumstances, the forces expected to be experienced by the axle body may be such that it is advantageous for the rear surface to be thicker than the front surface (see, for example, FIG. 6B). Similarly, the upper and lower surfaces of the axle body may have different thicknesses (see, for example, FIG. 6A or 6B). If the axle body is formed of first and second axle body pieces as described herein, the axle body pieces may have different thicknesses, which results in the opposing surfaces of the axle body (i.e., the upper and lower surfaces and the front and rear surfaces) having different thicknesses (see, for example, FIG. 6A or 6B). In one embodiment, the first and second axle body pieces each have a generally uniform thickness, with the thicknesses of the two axle body pieces being different. In such an embodiment, the two surfaces of the axle body formed by the first axle body piece (i.e., the lower surface and the rear surface or the lower surface and the front surface) have the same thickness, the two surfaces of the axle body formed by the second axle body piece (i.e., the upper surface and the front surface or the upper surface and the rear surface) have the same thickness, and the two surfaces defined by the first axle body piece (the lower and rear surfaces in the illustrated embodiment) have a different thickness than the two surfaces defined by the second axle body piece (the upper and front surfaces in the illustrated embodiment), as shown in FIG. 6A or 6B. In the illustrated embodiment, the axle seat 14 is configured to be secured in part to the upper and front surfaces 20 and 24 of the axle body 12, so it may be preferable for the second axle body piece 30 be thicker than the first axle body piece 28 on account of the forces applied to the axle seat 14 being transmitted to the upper and front surfaces 20 and 24 of the axle body 12, which are defined by the second axle body piece 30 (see, for example, FIG. 6A).

In one embodiment of a method for manufacturing an axle 10 according to the present disclosure, one or two sheets of material are used to form the first and second axle body pieces 28 and 30 in their unbent configurations of FIGS. 13 and 16, respectively. Each axle body piece is then bent or otherwise reconfigured to place the axle body pieces into their bent configurations of FIGS. 14-15 (first axle body piece 28) and FIGS. 17-18 (second axle body piece 30).

With the first and second axle body pieces 28 and 30 in their bent configurations, they may be arranged together to form the general frame of an axle body 12 (FIGS. 10-12). In the illustrated embodiment, the upper edge 56 of the first portion 32 of the first axle body piece 28 (which may be relatively straight or linear) is positioned in contact with or adjacent to the face 58 of the first portion 46 of the second axle body piece 30, with the upper suspension component support(s) 54 extending beyond the first portion 32 of the first axle body piece 28 (i.e., the rear surface 26 of the axle body 12), as shown in FIG. 12. The lower edge 60 of the second portion 48 of the second axle body piece 30 (which may be relatively straight or linear) is positioned in contact with or adjacent to the face 62 of the second portion 34 of the first axle body piece 28, with the lower suspension component support(s) 40 extending beyond the second portion 48 of the second axle body piece 30 (i.e., the front surface 24 of the axle body 12), as shown in FIG. 12. The first and second axle body pieces 28 and 30 may be secured together at or adjacent to the locations at which they contact each other. Any of a variety of methods may be employed to secure the first and second axle body pieces 28 and 30 together to form the axle body 12 but, in one embodiment, the two axle body pieces 28 and 30 are welded together.

In one embodiment, which is shown in FIG. 12, the upper edge 56 of the first portion 32 of the first axle body piece 28 may contact the face 58 of the first portion 46 of the second axle body piece 30 at a position inboard of an edge 64 of the first portion 46 of the second axle body piece 30, such that the edge 64 extends some amount beyond the rear surface 26 of the axle body 12. Similarly, the lower edge 60 of the second portion 48 of the second axle body piece 30 may contact the face 62 of the second portion 34 of the first axle body piece 28 at a position inboard of an edge 66 of the second portion 34 of the first axle body piece 28, such that the edge 66 extends some amount beyond the front surface 24 of the axle body 12. If the first and second axle body pieces 28 and 30 are so configured prior to securing them together, the extending edge portions may provide an improved surface for welding the axle body pieces 28 and 30 together compared to the surface that would be available if the edges of the axle body pieces 28 and 30 were matched together prior to securing the axle body pieces 28 and 30 to each other. Additionally, such a configuration may be advantageous in that the weld locations are spaced away from the surfaces of the axle body 12 that would typically be in tension during use (e.g., the underside of the second portion 34 of the first body piece 34).

With the axle body 12 formed, the gooseneck portions 16 may be secured to the ends of the axle body 12, as shown in FIGS. 7-9. Thereafter, any suspension components may be secured to the axle body 12 (e.g., the axle seats 14 of FIGS. 1-6) or otherwise associated with the axle 12 (e.g., by pivotally connecting steering knuckles to the king pins 18). Alternatively, some or all of the suspension components to be secured to the axle body 12 may be secured thereto prior to securing the gooseneck portions 16 to the axle body 12.

When the axle 10 has been fully assembled (or, in some embodiments, prior to complete assembly of the axle 10), it may be incorporated into a vehicle.

Figure 1:
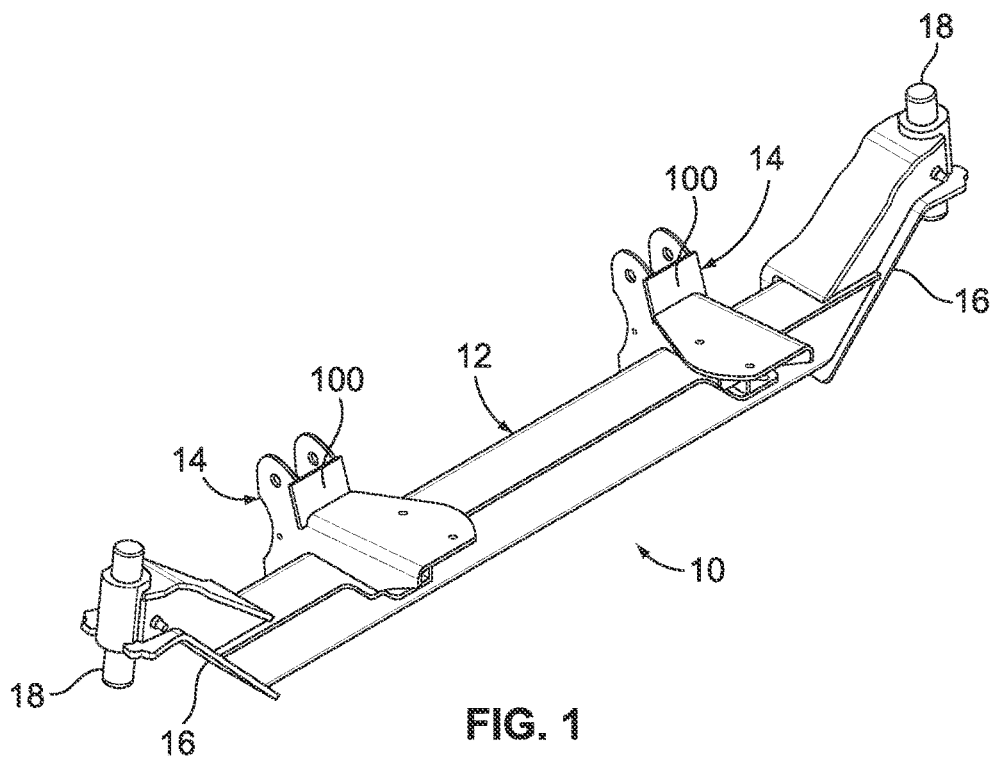
FIG. 1 is a rear perspective view of a vehicle axle according to an aspect of the present disclosure.
Figure 2:
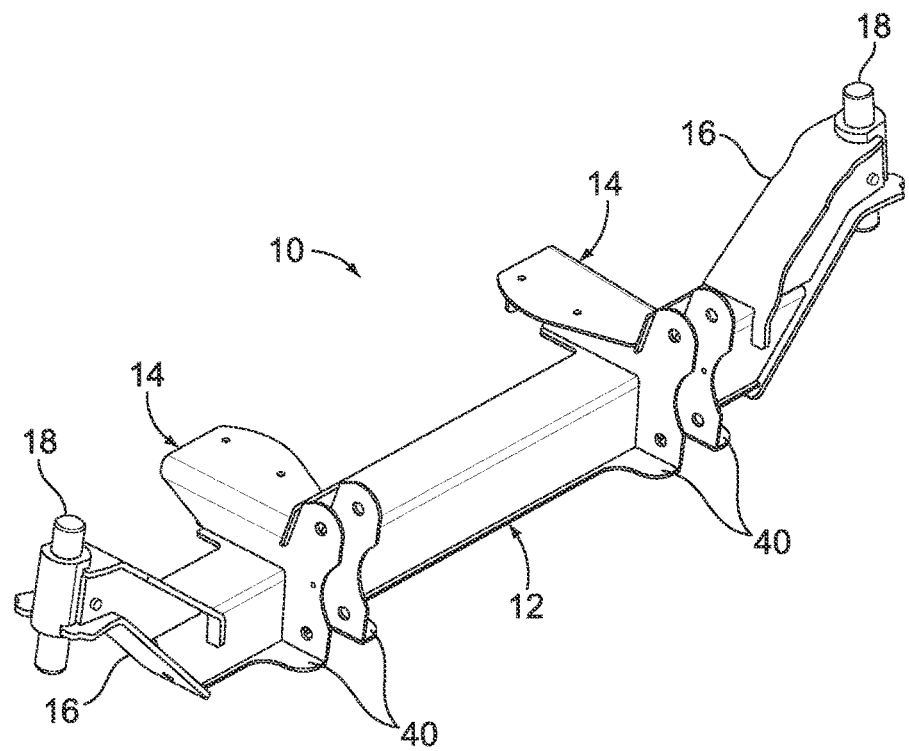
FIG. 2 is a front perspective view of the vehicle axle of FIG. 1.
Figure 3:
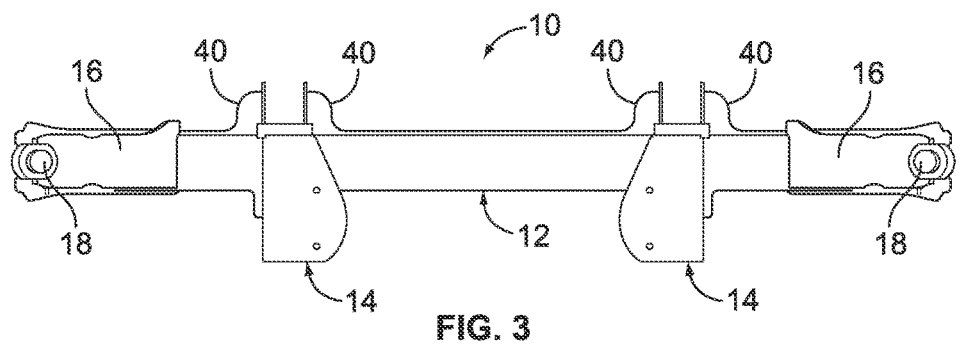
FIG. 3 is a top plan view of the vehicle axle of FIG. 1.

As described above, a variety of suspension components may be used in combination with the axles according to the present disclosure. FIG. 1 shows two axle seats 14 secured to the upper surface 20, front surface 24, and suspension component supports 40 and 54 of the axle body 12, with the axle seats 14 being mirror images of each other. FIGS. 19-25 illustrate the components of one embodiment of an axle seat 14 that may be used in combination with axles according to the present disclosure or with other axles.

Each illustrated axle seat 14 may be comprised of a first plate 68 (FIGS. 19-21) and a second plate 70 (FIGS. 22-25). The first plate 68 may be considered to include a first section 72 and a second section 74, with the two sections 72 and 74 separated by a bend line 76. The first section 72 defines a vertically aligned ear 78 and a vertically aligned frame member 80. The lower edge 82 of the ear 78 may be configured to be supported upon a lower suspension component support 40 of the axle body 12, while the lower edge 84 of the frame member 80 may be configured to be supported upon the upper surface 20 of the axle body 12 and an upper suspension component support 54 of the axle body 12 (FIG. 6). The edge 86 of the ear 78 facing the axle body 12 may be configured to be flush against the front surface 24 of the axle body 12 when the axle seat 14 is arranged onto the axle body 12 (FIG. 6). In the illustrated embodiment, the ear 78 is provided with a plurality of holes or openings 88 configured for connecting the axle seat 14 to parallel pivoting arms of an axle lift assembly of the type described in greater detail in U.S. Pat. No. 5,403,031 to Gottschalk et al., which is hereby incorporated herein by reference.

Figure 4:
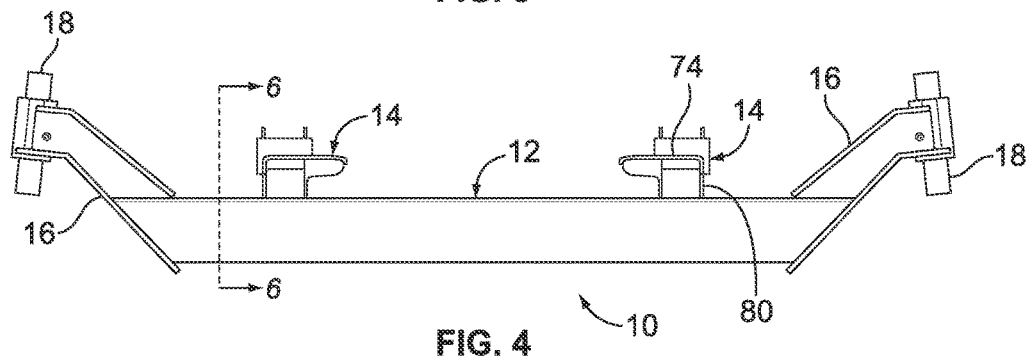
FIG. 4 is a rear elevational view of the vehicle axle of FIG. 1.
Figure 5:
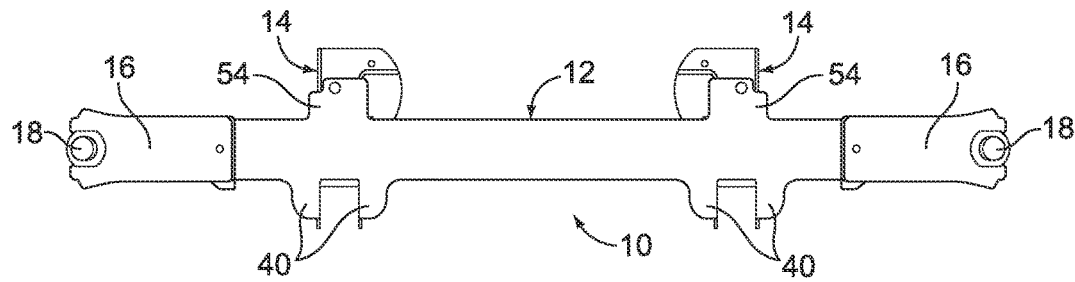
FIG. 5 is a bottom plan view of the vehicle axle of FIG. 1.

The second section 74 of the first plate 68 provides, when bent to be generally perpendicular to the first section 72 (FIGS. 20 and 21), a platform to which the lower end of an air spring or the like may be secured. The frame member 80 of the first section 72 elevates the second section 74 above the upper surface 20 of the axle body 12, as best shown in FIG. 4.

Similar to the first plate 68, the second plate 70 may be considered to include a first section 90 and a second section 92, with the two sections 90 and 92 separated by a bend line 94. The first section 96 defines a vertically aligned ear 96 and a vertically aligned frame member 98, which may be similarly configured to the corresponding ear 78 and frame member 80 of the first plate 68. The second section 92 of the illustrated second plate 70 is relatively small and may provide, when bent to be generally perpendicular to the first section 90 (FIGS. 23-25), an additional support for the platform defined by the second section 74 of the first plate 68.

Figure 19:
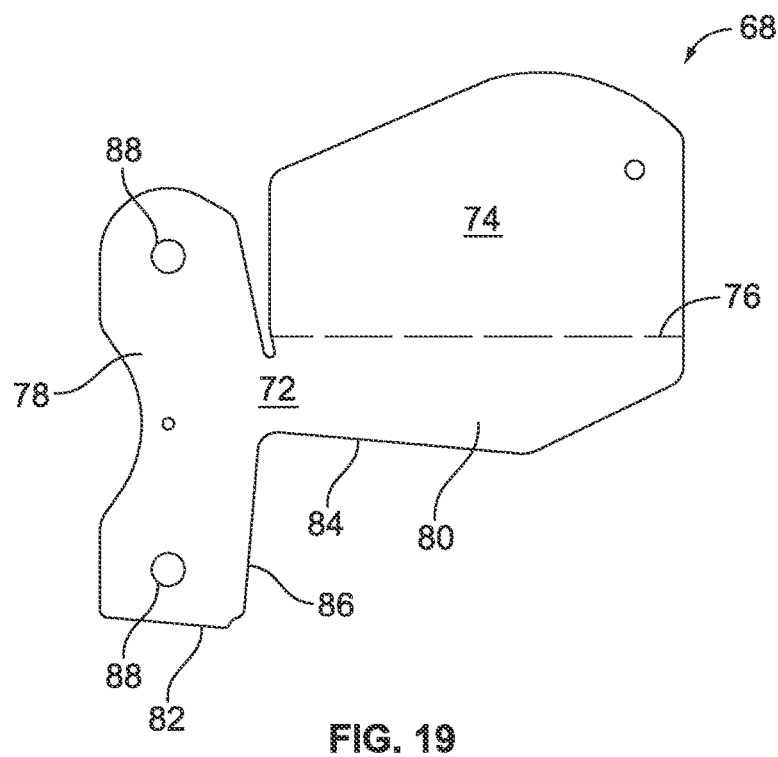
FIG. 19 is a plan view of a first axle seat plate of an axle seat of the vehicle axle of FIG. 1, in an unbent configuration.
Figure 20:
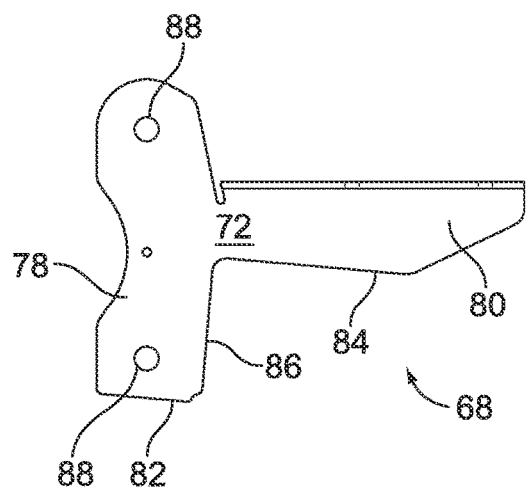
FIG. 20 is a front elevational view of the first axle seat plate of FIG. 19, in a bent configuration.
Figure 21:
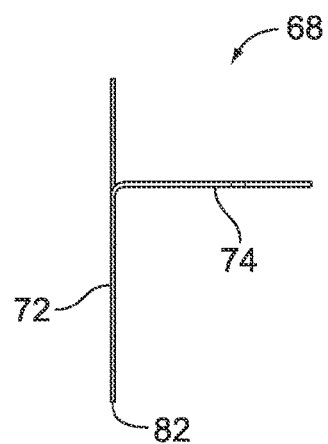
FIG. 21 is a side elevational view of the first axle seat plate of FIG. 19, in a bent configuration.
Figure 22:
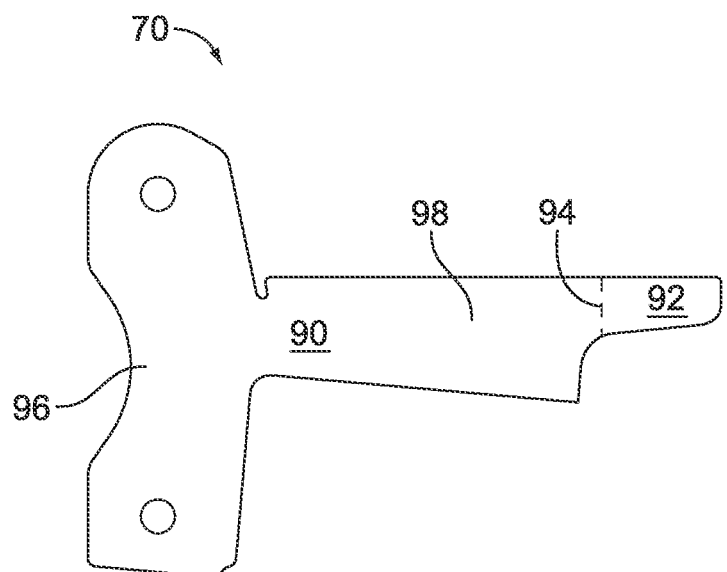
FIG. 22 is a plan view of a second axle seat plate of an axle seat of the vehicle axle of FIG. 1, in an unbent configuration.
Figure 23:
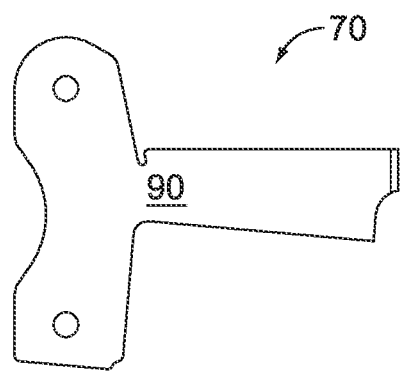
FIG. 23 is a front elevational view of the second axle seat plate of FIG. 22, in a bent configuration.
Figure 24:
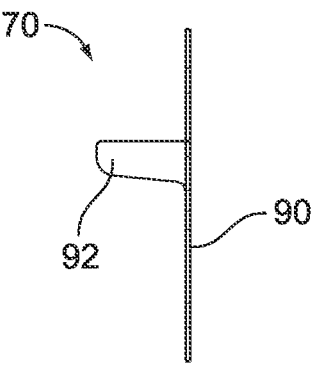
FIG. 24 is a side elevational view of the second axle seat plate of FIG. 22, in a bent configuration.
Figure 25:
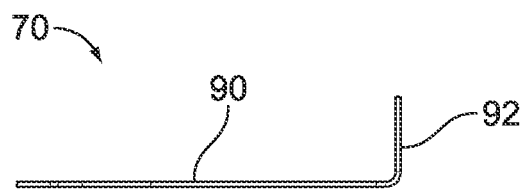
FIG. 25 is a bottom plan view of the second axle seat plate of FIG. 22, in a bent configuration.

In one embodiment of a method for assembling the axle seat 14, one or two sheets of material are used to form the first and second plates 68 and 70 in their unbent configurations of FIGS. 19 and 22, respectively. Each plate is then bent or otherwise reconfigured to place the plates into their bent configurations of FIGS. 20-21 (first plate 68) and FIGS. 23-25 (second plate 70).

With the first and second plates 68 and 70 in their bent configurations, the plates 68 and 70 may be arranged with the first sections 72 and 90 generally parallel to each other and spaced an appropriate distance apart. The second section 74 of the first plate 68 may be arranged so as to extend toward the second plate 70, with the second section 92 of the second plate 70 extending toward the first plate 68. The second section 92 of the second plate 70 may then be secured to the underside of the second section 74 of the first plate 68. A stabilizing plate 100 (FIG. 1) may be attached to the ears 78 and 96 to provide additional stability, strength, and rigidity to the axle seat 14, if desired.

Thereafter, when the axle seat 14 has been fully assembled, the first sections 72 and 90 of the plates 68 and 70 may be secured (e.g., by welding) to the axle body 12, with the ears 78 and 96 being secured to the lower suspension component support 40 and the front surface 24 of the axle body 12, and the frame members 80 and 98 being secured to the upper suspension component support 54 and the upper surface 20 of the axle body 12. The axle seat 14 may then be connected to other vehicle components, such as the ears 78 and 96 being connected to pivoting arms of an axle lift assembly and the second section 74 of the first plate 68 being connected to an air spring.

Figure 26:
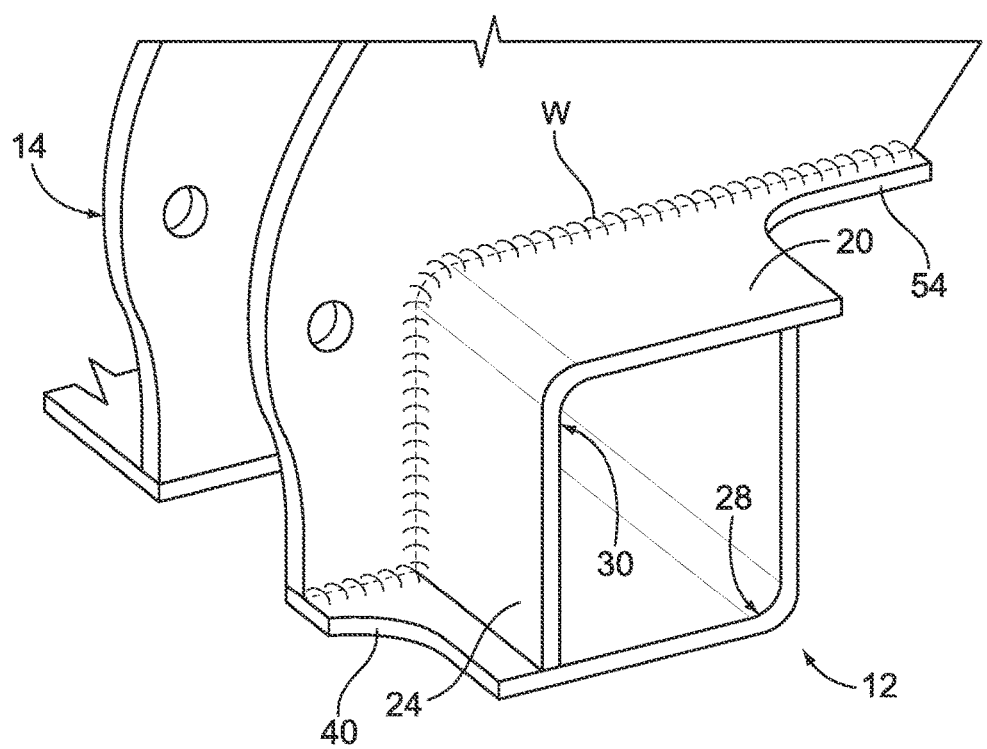
FIG. 26 is a perspective view showing a weld for securing an axle seat to an axle body.

FIG. 26 shows an exemplary configuration of a weld W securing an axle seat 14 to the axle body 12. As shown in FIG. 26, the weld W begins at one of the suspension component supports 40 or 54, extends along the front surface 24 and upper surface 20 of the axle body 12, and terminates at the other suspension component support. It will be seen that, while the weld W extends along the front surface 24 and the upper surface 20 of the axle body 12, it does not have a weld stop location at either surface. Instead, the weld stop locations are located at the suspension component supports 40 and 54. Such a configuration may be advantageous due to the loading at the various areas of the axle body 12 during use. In particular, the front and rear surfaces 24 and 26 of the axle body 12 (where the weld stop locations of a weld connecting an axle seat to an axle body are typically located) will typically be high stress areas during use and may be subject to "oil can" motion, whereby they may be caused to flex forwardly and/or rearwardly during use. Placing a weld stop location at such surfaces is preferably avoided to avoid fatigue cracking. On the other hand, the weld W will typically experience shear forces at the suspension component supports 40 and 54, which the weld W is generally better suited to withstand than the flexing which may take place at the axle body front and rear surfaces 24 and 26. Those of ordinary skill in the art will appreciate that such a weld configuration may be employed with any of a variety of axle body configurations and is not limited to use in combination with a two-piece axle body of the type described herein.

Other methods of assembling the axle seat 14 may also be employed without departing from the scope of the present disclosure. For example, in other embodiments, the plates 68 and 70 may be secured to the axle body 14 prior to bending one or both of them and securing them to each other.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A vehicle axle body comprising:
   a first axle body piece defining at least a portion of a lower surface of the vehicle axle body and at least a portion of a rear surface of the vehicle axle body; and
   a second axle body piece secured to the first axle body piece and defining at least a portion of an upper surface of the vehicle axle body and at least a portion of a front surface of the vehicle axle body, wherein the first axle body piece further comprises a lower suspension component support integrally formed therewith and extending beyond the front surface and/or the second axle body piece further comprises an upper suspension component support integrally formed therewith and extending beyond the rear surface.

2. The vehicle axle body of claim 1, wherein the first axle body piece defines substantially all of the lower surface of the vehicle axle body and substantially all of the rear surface of the vehicle axle body.

3. The vehicle axle body of claim 1, wherein the second axle body piece defines substantially all of the upper surface of the vehicle axle body and substantially all of the front surface of the vehicle axle body.

4. The vehicle axle body of claim 1, wherein the first axle body piece has a generally uniform thickness and the second axle body piece has a generally uniform thickness different from the thickness of the first axle body piece.

5. The vehicle axle body of claim 1, further comprising an axle seat secured to at least one of the axle body pieces by a weld having a weld stop location located at an area of the vehicle axle body spaced away from the upper, lower, front, and rear surfaces of the vehicle axle body.

6. The vehicle axle body of claim 5, wherein
   the upper surface comprises the upper suspension component support,
   the lower surface comprises the lower suspension component support, and
   the weld stop location is located at the upper or lower suspension component support.

7. The vehicle axle body of claim 6, wherein
   the weld has a plurality of weld stop locations,
   at least one of the weld stop locations is located at the upper suspension component support, and
   at least one of the weld stop locations is located at the lower suspension component support.

8. The vehicle axle body of claim 1, wherein the lower suspension component support or the upper suspension component support receives an axle seat.

9. The vehicle axle body of claim 1 wherein the lower suspension component support defines a surface that is coplanar with the lower surface of the vehicle axle body and/or the upper suspension component support defines a surface that is coplanar with the upper surface of the vehicle axle body.

10. The vehicle axle body of claim 1 wherein the first axle body piece defines no part of the upper surface of the vehicle axle body.

11. The vehicle axle body of claim 1 wherein the second axle body piece defines no part of the lower surface of the vehicle axle body.

12. The vehicle axle body of claim 1, the first axle body piece having the lower suspension component support integrally formed in one piece construction with the first axle body piece and extending beyond the front surface of the vehicle axle body, or the second axle body piece having the upper suspension component support integrally formed in one piece construction with the second axle body piece and extending beyond the rear surface of the vehicle axle body.

13. The vehicle axle body of claim 1, the first axle body piece having the lower suspension component support integrally formed in one piece construction with the first axle body piece and extending beyond the front surface of the vehicle axle body, and the second axle body piece having the upper suspension component support integrally formed in one piece construction with the second axle body piece and extending beyond the rear surface of the vehicle axle body.

14. A method of manufacturing a vehicle axle body comprising:
   providing a first axle body piece and a second axle body piece;
   forming the first and second axle body pieces into bent configurations;
   securing the first axle body piece to the second axle body piece, with
   the first axle body piece defining at least a portion of a lower surface of the vehicle axle body and at least a portion of a rear surface of the vehicle axle body,
   the second axle body piece defining at least a portion of an upper surface of the vehicle axle body and at least a portion of a front surface of the vehicle axle body, and
   the first axle body piece further comprising a lower suspension component support integrally formed therewith and extending beyond the front surface and/or the second axle body piece further comprises an upper suspension component support integrally formed therewith and extending beyond the rear surface.

15. The method of claim 14, wherein said securing the first axle body piece to the second axle body piece includes securing the first axle body piece to the second axle body piece such that the first axle body piece defines substantially all of the lower surface of the vehicle axle body and substantially all of the rear surface of the vehicle axle body.

16. The method of claim 14, wherein said securing the first axle body piece to the second axle body piece includes securing the first axle body piece to the second axle body piece such that the second axle body piece defines substantially all of the upper surface of the vehicle axle body and substantially all of the front surface of the vehicle axle body.

17. The method of claim 14, wherein said providing a first axle body piece and a second axle body piece includes providing a first axle body piece having a generally uniform thickness and a second axle body piece having a generally uniform thickness different from the thickness of the first axle body piece.

18. The method of claim 14, further comprising
providing an axle seat, and
welding the axle seat to at least one of the axle body pieces by a weld having a weld stop location located at an area of the vehicle axle body spaced away from the upper, lower, front, and rear surfaces of the vehicle axle body.

19. The method of claim 18, wherein
said providing the first axle body piece and the second axle body piece includes providing the upper surface with the upper suspension component support and the lower surface with the lower suspension component support, and
said welding the axle seat to at least one of the axle body pieces includes locating the weld stop location at the upper or lower suspension component support.

20. The method of claim 19, wherein said welding the axle seat to at least one of the axle body pieces includes welding the axle seat to at least one of the axle body pieces by a weld having a plurality of weld stop locations, with at least one of the weld stop locations located at the upper suspension component support, and at least one of the weld stop locations located at the lower suspension component support.

21. A vehicle axle body comprising:
an upper surface;
a lower surface;
a front surface extending between the upper and lower surfaces;
a rear surface extending between the upper and lower surfaces; and
an axle seat secured to at least one of the upper, lower, front, and rear surfaces by a weld having a weld stop location located at an area of the vehicle axle body spaced away from the upper, lower, front, and rear surfaces of the vehicle axle body.

22. The vehicle axle body of claim 21, wherein the rear surface is defined at least in part by a first axle body piece and the front surface is defined at least in part by a second axle body piece secured to the first axle body piece.

23. The vehicle axle body of claim 22, wherein the first axle body piece defines substantially all of the rear surface and the second axle body piece defines substantially all of the front surface.

24. The vehicle axle body of claim 22, wherein the first axle body piece defines substantially all of the lower surface of the vehicle axle body and the second axle body piece defines substantially all of the upper surface of the vehicle axle body.

25. The vehicle axle body of claim 22, wherein the first axle body piece has a generally uniform thickness and the second axle body piece has a generally uniform thickness different from the thickness of the first axle body piece.

26. The vehicle axle body of claim 24, wherein the first axle body piece has a different thickness than the second axle body piece.

27. The vehicle axle body of claim 24, wherein the first axle body piece further comprises a lower suspension component support integrally formed therewith and extending beyond the front surface.

28. The vehicle axle body of claim 24, wherein the second axle body piece further comprises an upper suspension component support integrally formed therewith and extending beyond the rear surface.

29. The vehicle axle body of claim 21, wherein
the upper surface comprises an upper suspension component support,
the lower surface comprises a lower suspension component support, and
the weld stop location is located at the upper or lower suspension component support.

30. The vehicle axle body of claim 29, wherein
the weld has a plurality of weld stop locations,
at least one of the weld stop locations is located at the upper suspension component support, and
at least one of the weld stop locations is located at the lower suspension component support.

31. The vehicle axle body of claim 21, the rear surface having a different thickness opposite the front surface.

32. A vehicle axle body comprising:
an upper surface;
a lower surface;
a front surface extending between the upper and lower surfaces; and
a rear surface extending between the upper and lower surfaces;
wherein the rear surface is defined at least in part by a first axle body piece and the front surface is defined at least in part by a second axle body piece; and
wherein the first axle body piece and the second axle body piece are secured together along a first set of respective engagement surfaces thereof and one of the first axle body piece and the second axle body piece extends beyond the first set of respective engagement surfaces in a direction transverse to and away from the vehicle axle body to provide a first extending edge portion.

33. The vehicle axle body of claim 32 wherein the first axle body piece and the second axle body piece are secured together along a second set of respective engagement surfaces thereof and the other one of the first axle body piece and the second axle body piece extends beyond the second set of respective engagement surfaces in a direction transverse to and away from the vehicle axle body to provide a second extending edge portion.

34. The vehicle axle body of claim 33 wherein
a first vehicle axle body weld secures the first axle body piece and the second axle body piece together along the first set of respective engagement surfaces, and the first vehicle axle body weld abuts the first extending edge portion.

35. The vehicle axle body of claim 34 wherein
a second vehicle axle body weld secures the first axle body piece and the second axle body piece together along the second set of respective engagement surfaces, and the second vehicle axle body weld abuts the second extending edge portion.

36. The vehicle axle body of claim 35 wherein the first and second axle body welds are positioned on opposite sides of the vehicle axle body.

37. The vehicle axle body of claim 36 wherein the first and second axle body welds are positioned diagonally from one another across the vehicle axle body.

38. The vehicle axle body of claim 32, the rear surface having a different thickness opposite the front surface.

* * * * *